United States Patent [19]
Bedard et al.

[11] 3,967,641
[45] July 6, 1976

[54] CLUTCH ASSEMBLY

[75] Inventors: Joseph A. Bedard; Roger G. Hills, both of Eugene, Oreg.

[73] Assignee: IRECO Industries, Inc., Eugene, Oreg.

[22] Filed: Jan. 31, 1975

[21] Appl. No.: 545,990

Related U.S. Application Data

[63] Continuation of Ser. No. 385,969, Aug. 6, 1973, abandoned.

[52] U.S. Cl. .............................................. 137/344
[51] Int. Cl.² ...................... A01G 25/02; B05B 3/12
[58] Field of Search ...................... 134/344; 239/212

[56] References Cited
UNITED STATES PATENTS
3,202,172   8/1965   Bergeron et al. .................... 137/344

*Primary Examiner*—Henry T. Klinksiek
*Attorney, Agent, or Firm*—Klarquist, Sparkman, Campbell, Leigh, Hall & Whinston

[57] ABSTRACT

A wheeled power carriage supports an engine driving a pipeline rotatably supported by the carriage. The pipeline is also supported by wheels keyed thereto. The carriage is selectively driven by sprockets mounted rotatably on the pipeline and selectively clutched to the pipeline for rotation therewith.

3 Claims, 5 Drawing Figures

CLUTCH ASSEMBLY

CROSS REFERENCE TO RELATED APPLICATION

This application is a continuation of application Ser. No. 385,969, filed Aug. 6, 1973 (now abandoned).

DESCRIPTION

This invention relates to an improved drive for an irrigation line move, and has for an object thereof the provision of an irrigation line move in which the drive to the wheels of a power carriage is selectively disconnected.

Another object of the invention is to provide an irrigation move in which a central section of a pipeline is coupled to outer sections supported by and keyed to wheels, and sprockets mounted rotatably on the central section and coupled to carriage wheels which are selectively pinned to the central section.

Figure 1:
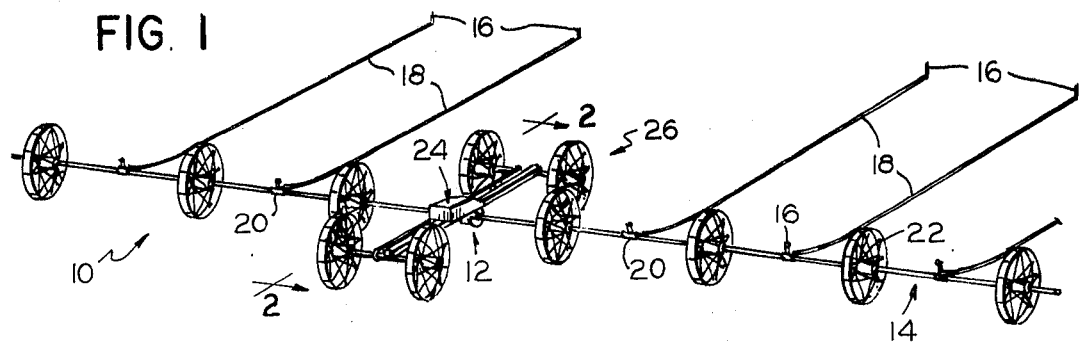
FIG. 1 is a perspective view of an irrigation line move including an improved drive forming one embodiment of the invention.
Figure 2:
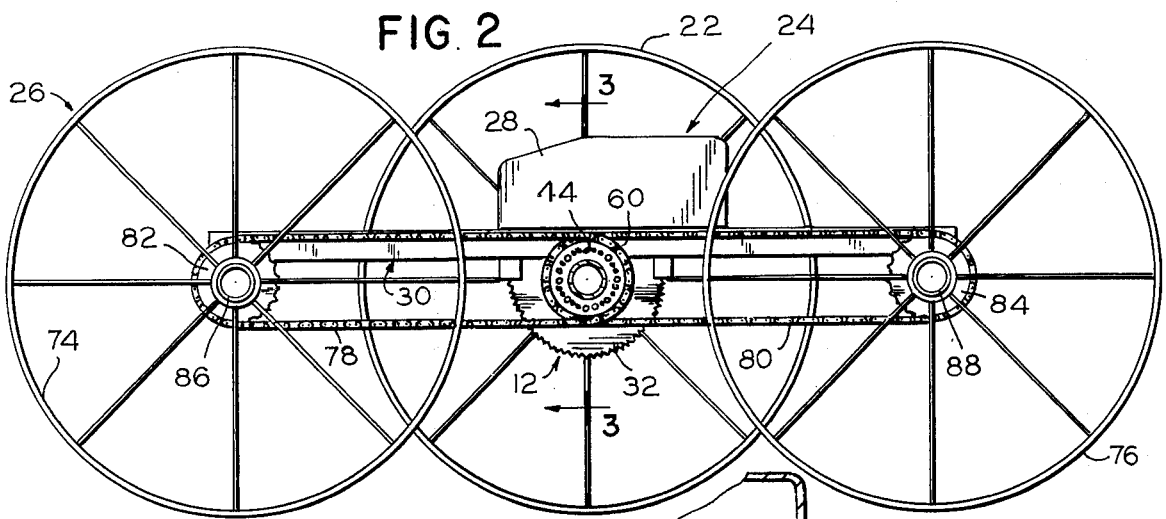
FIG. 2 is an enlarged vertical section taken along line 2—2 of FIG. 1.
Figure 3:
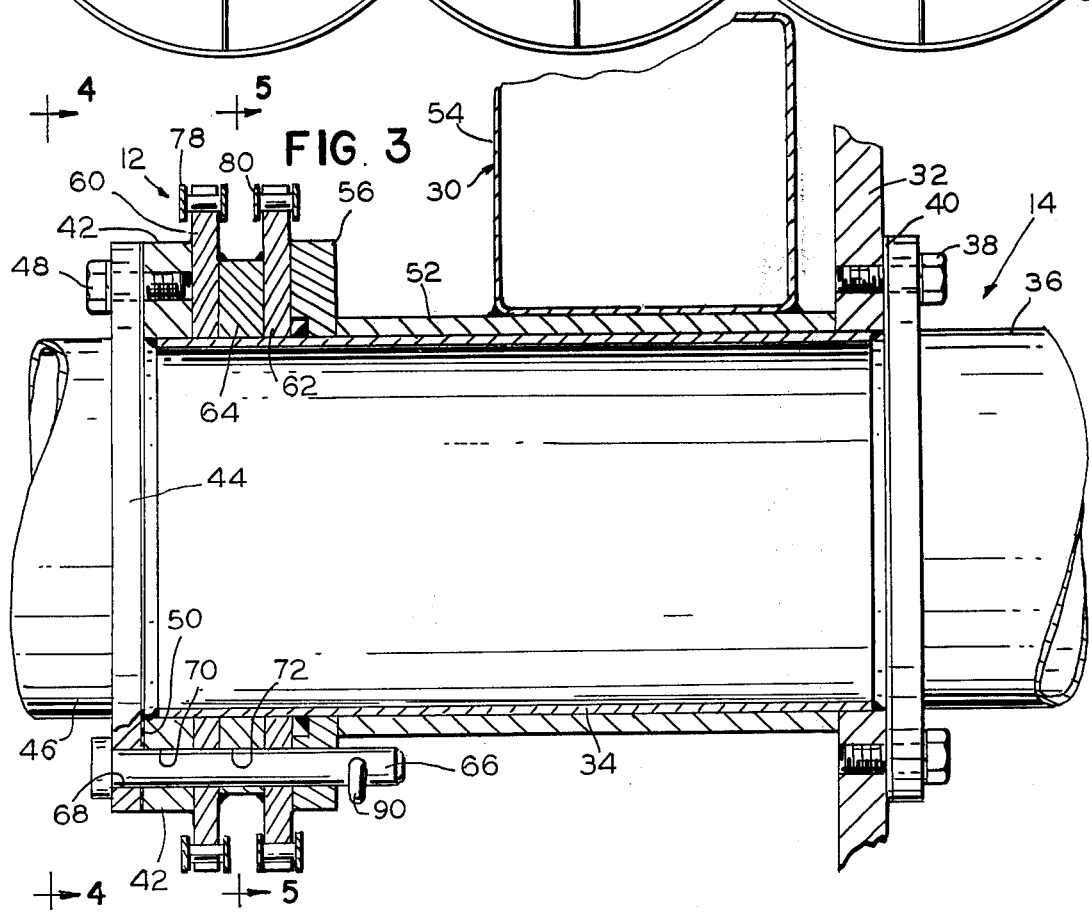
FIG. 3 is an enlarged vertical section taken along line 3—3 of FIG. 2.
Figure 4:
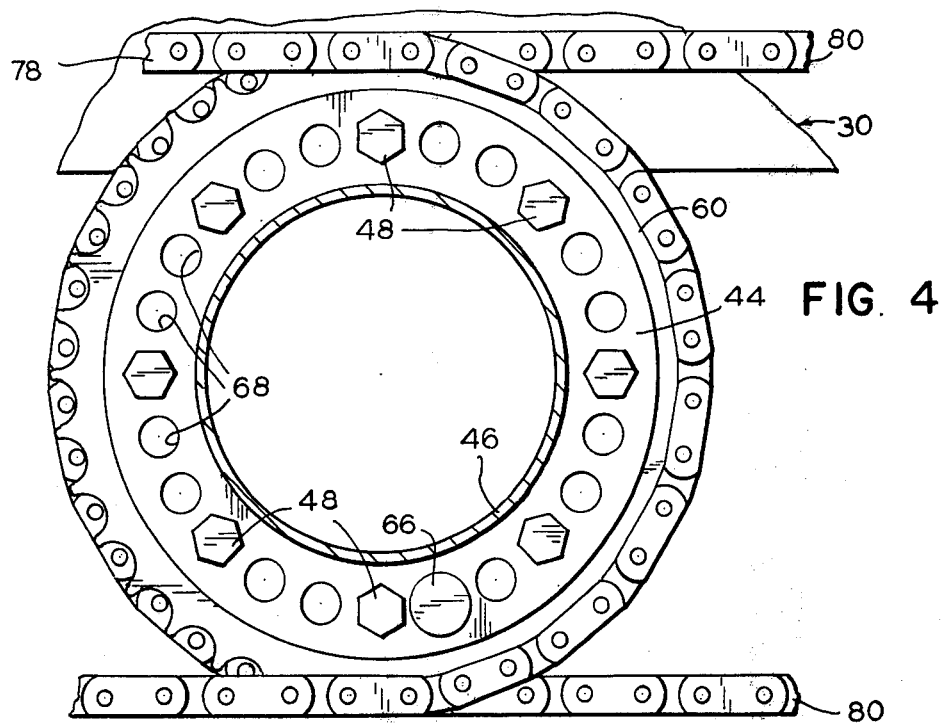
FIG. 4 is an enlarged vertical section taken along line 4—4 of FIG. 3.
Figure 5:
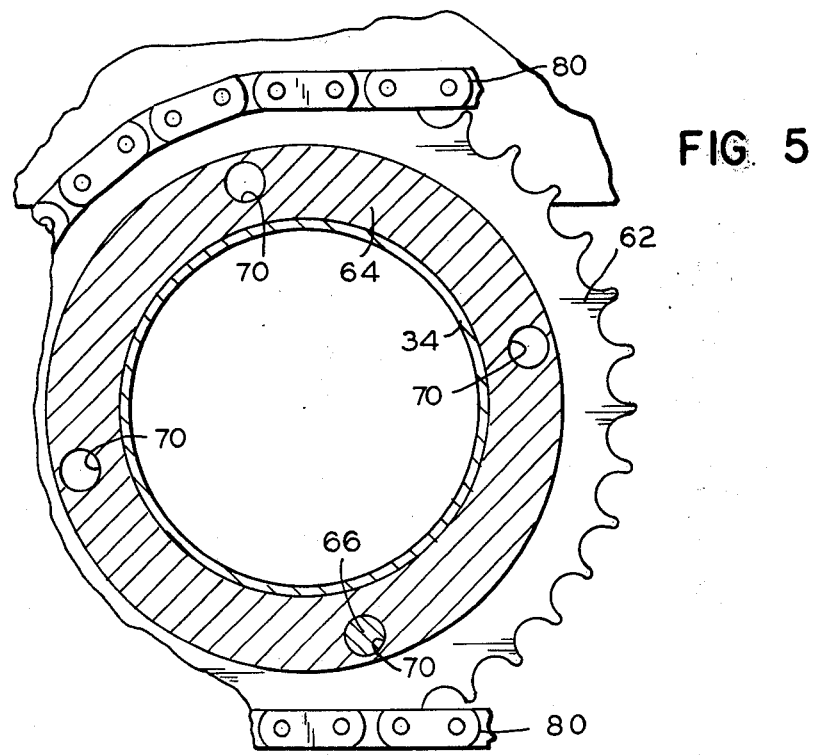
FIG. 5 is an enlarged vertical section taken along line 5—5 of FIG. 3.

Referring now in detail to the drawings, there is shown therein an irrigation line move 10 including an improved drive 12 forming one specific embodiment of the invention. The move inlcudes a pipeline 14 which acts as a torque tube as well as a water supply to sprinklers 16 mounted on trail lines 18 and rotary couplers 20 supplied with water from the pipeline. Wheels 22 are keyed to the pipeline and are rotated thereby when the pipeline is rotated by a power unit 24 on a power carriage 26.

The power unit 24 may comprise a reversible drive including a gasoline engine, electric motor or water motor in a housing 28 on a frame or chassis 30 of the carriage. The power unit, when energized, continuously rotates a bull gear 32 welded and thereby sealed to a short pipe section 34 of the pipeline 14 and forming a coupling flange to which a long flanged pipe section 36 of the pipeline 14 is secured by capscrews 38, a gasket 40 being positioned therebetween.

A flange 42 welded to the pipe section 34 is connected rigidly to a flange 44 of a long pipe section 46 by capscrews 48, and is sealed to the flange 44 by gasket 50. A sleeve 52 welded to tubular chassis member 54 journals the pipe section 34 and is positioned between the bull gear 32 and collar 56 welded to the pipe section 34.

A pair of sprockets 60 and 62 are mounted rotatably on the pipe section 34 between the flange 42 and the collar 56 and are welded to an annular spacer 64 rotatable on the pipe section 34. A pin 66 forming keying means is manually insertable through any of a large number of aligned holes 68 and 70 through the flanges 42 and 44, respectively, and through any of four holes 72 through the sprockets 60 and 62 and the spacer 64. The sprockets 60 and 62 drive wheels 74 and 76 through chains 78 and 80, sprockets 82 and 84 and axles 86 and 88. A manually removable cotter pin 90 holds the pin 66 against accidental removal.

Whenever desired to drive the line except for the power carriage 26, the pin 66 is removed and the pipeline is rotated to roll the wheels 22. Then to drive the power carriage 26 along with the rest of the line, the pin is reinserted through the holes 70 most closely aligned with the hole 72 and the hole 72 and pin then are easily brought into alignment, the pin is fully inserted and the cotter pin 90 placed in the pin.

What is claimed is:

1. In an irrigation line move,
a drive tube having a first pipe coupling flange at one end thereof and a collar on that end portion of the drive tube and keyed to the drive tube,
a bull gear secured rigidly to and sealed to the other end of the drive tube,
a journaling tube rotatably mounting the drive tube,
a sprocket unit mounted rotatably on the drive tube between the flange and the collar and including a pair of sprockets and a spacer between the sprockets and keyed to the sprockets,
the pipe coupling flange and the collar having aligned holes,
the sprocket unit having holes adapted to be aligned with the holes in the flange and the collar,
and keying means comprising a removable pin adapted to be inserted through the holes to selectively key the sprocket unit to the drive tube.

2. The irrigation line move of claim 1 including pair of flanged pipe sections bolted to the flange and the bull gear and sealed thereto.

3. In an irrigation line move, and
a pair of flanged pipe sections,
a drive tube having a flange at one end thereof and connected to one of the pipe sections,
a bull gear secured rigidly to and sealed to the other end of the drive tube and connected to the other pipe section,
a journaling tube rotatably mounting the drive tube,
a sprocket unit mounted rotatably on the drive tube and including a pair of sprockets and a spacer joined rigidly together,
and keying means for selectively keying the sprocket unit to the drive tube and including a pair of collars bracketing the sprocket unit and joined rigidly to the drive tube,
and removable pin means extending through the collars and the sprocket unit.

* * * * *